Feb. 14, 1956 — E. A. GLYNN — 2,734,225
TREAD CENTERING DEVICE FOR TIRE MOLDS
Filed Aug. 16, 1952 — 3 Sheets-Sheet 1
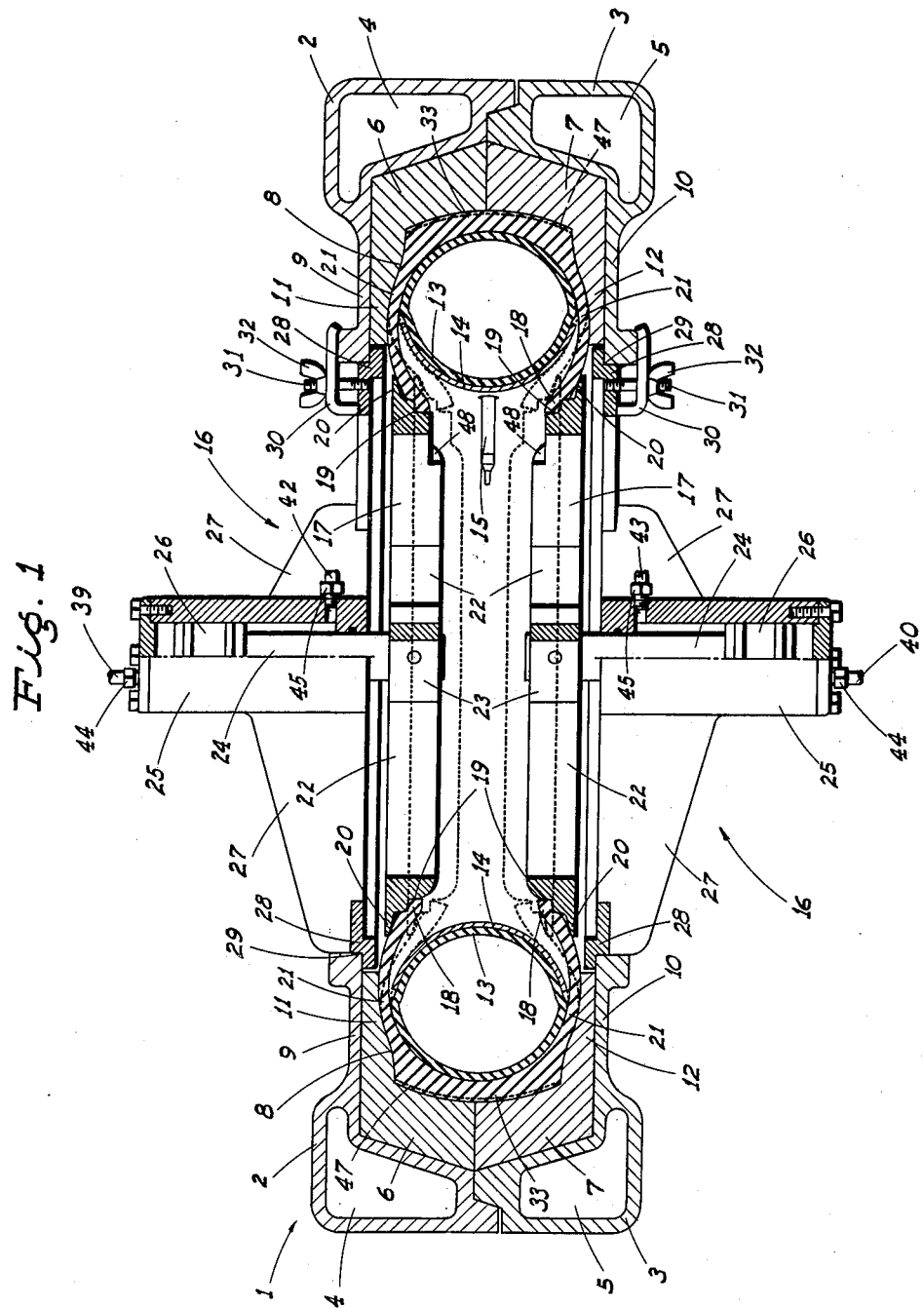
INVENTOR
EDWIN A. GLYNN
BY
Webster + Webster
ATTY'S.

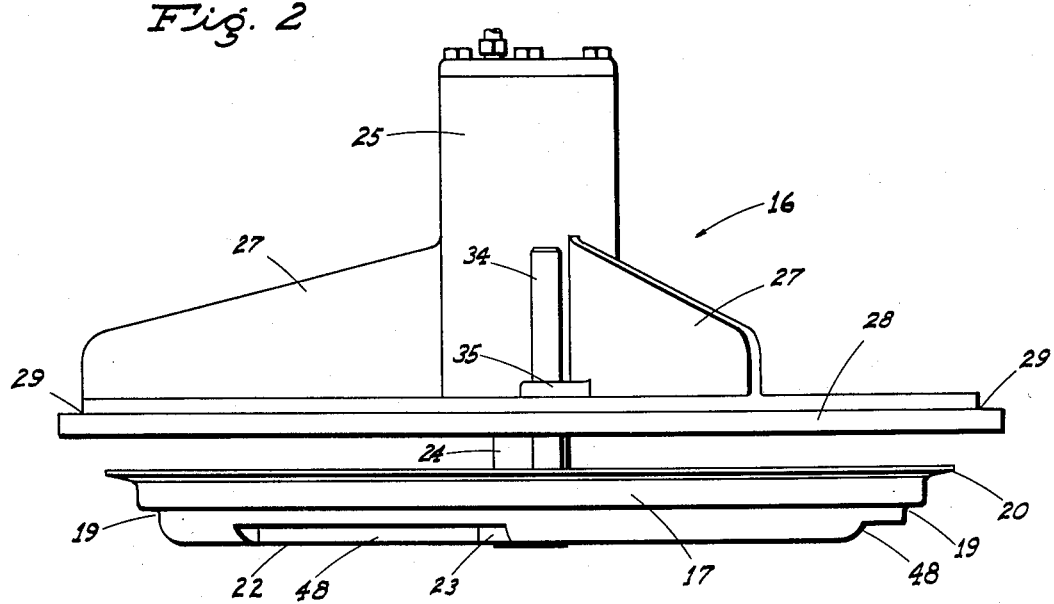
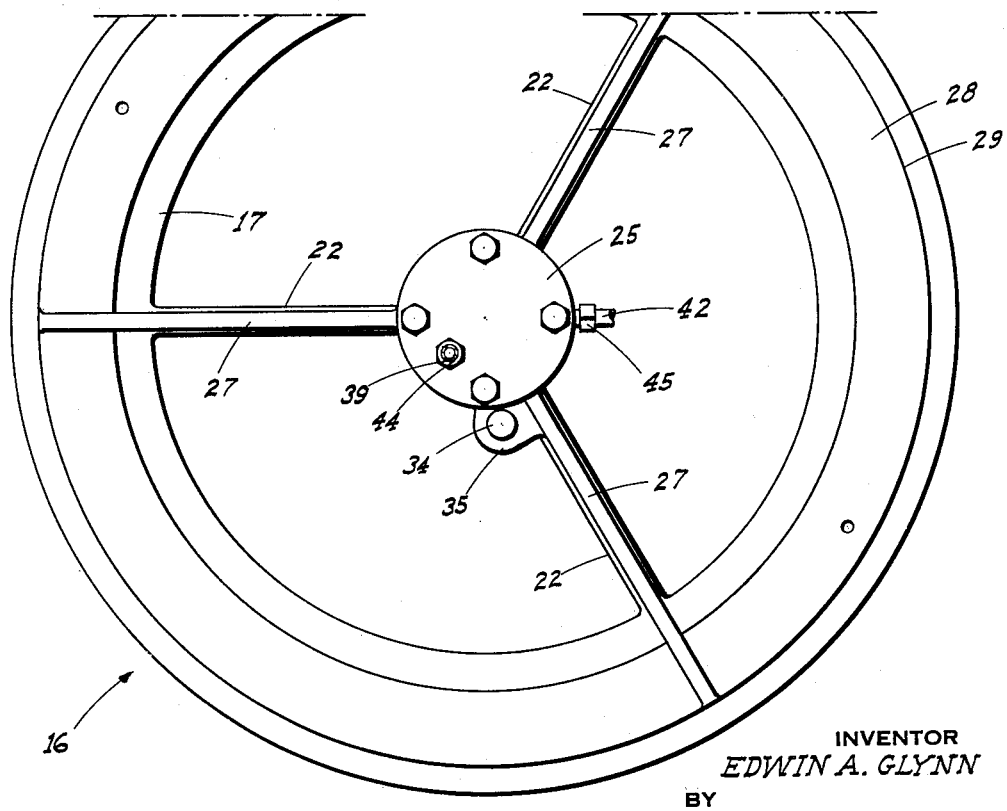

Feb. 14, 1956   E. A. GLYNN   2,734,225
TREAD CENTERING DEVICE FOR TIRE MOLDS
Filed Aug. 16, 1952   3 Sheets-Sheet 3
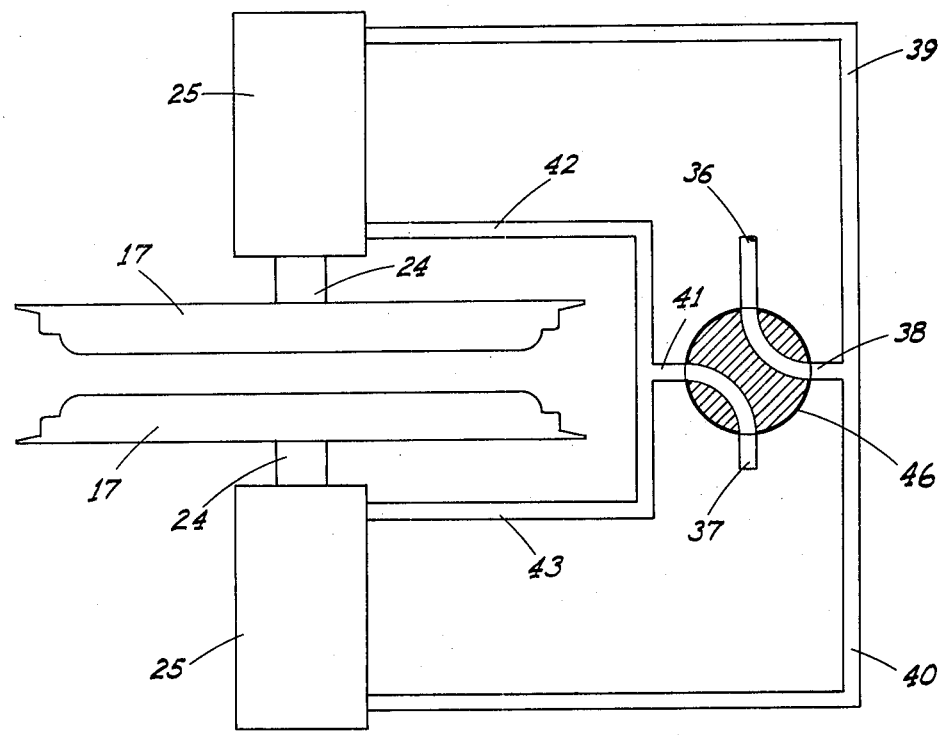
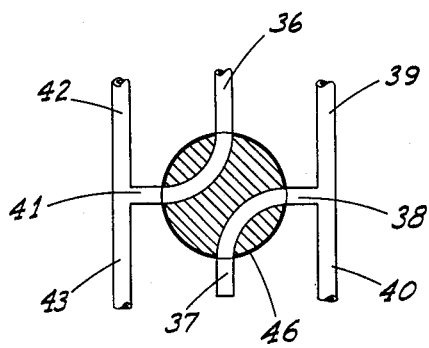
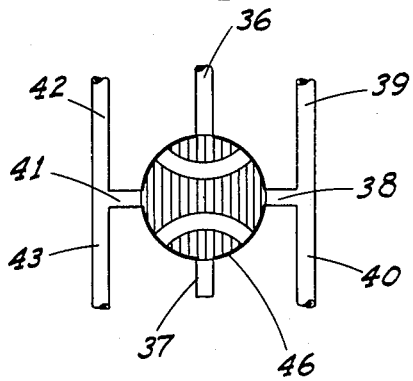
INVENTOR
EDWIN A. GLYNN
BY
Webster & Webster
ATTY'S.

United States Patent Office 2,734,225
Patented Feb. 14, 1956

2,734,225

TREAD CENTERING DEVICE FOR TIRE MOLDS

Edwin A. Glynn, Lodi, Calif., assignor to Super Mold Corporation of California, Lodi, Calif., a corporation of California Application August 16, 1952, Serial No. 304,694

4 Claims. (Cl. 18—18)

The present invention relates to improvements in tire retreading molds; the term "retreading" as used herein being intended to mean tire tread replacement by top capping, full capping, or full retreading.

In tire retreading molds of the type which include an annular body having a matrix therein channeled for the reception of a tire, there has heretofore been the objection that the tire did not always properly center in the matrix under the influence of the inflated air bag or tube retained in the tire by an inside curing rim.

Upon inflation of such air bag the tire had a tendency to skew laterally in one direction or the other, with the result that the new tread, as subsequently vulcanized on the tire, did not have true circumferential alinement thereon.

The major purpose of the present invention is to provide a device which engages and cooperates with the beads of the tire whereby to assure of its proper positioning in the matrix upon inflation of the air bag, to the end that the new tread is vulcanized circumferentially true on such tire.

Another important object of the present invention is to provide a device, as in the preceding paragraph, which includes pressure rings which bear against the tire beads from the outside when the tire is in position in the mold; such pressure rings being simultaneously yieldably urged inwardly by opposed power cylinders mounted in novel assembly in connection with the mold. By urging the tire beads simultaneously but yieldably inwardly during the period of inflation of the air bag, the tire effectively centers itself in the matrix, with the further advantage that such movement of the beads reduces the overall diameter of the tire, permitting its easy entry into the matrix without the latter scuffing the new but as yet unvulcanized tread rubber upon closing of the mold.

An additional object of this invention is to provide a tread centering device, for a tire mold, which embodies a novel mount for each pressure ring, and each mount carrying the related power cylinder in proper position for actuation of said ring.

A further object of the invention is to provide a tread centering device, as above, wherein the power cylinders— which urge the pressure rings inwardly—are coupled in a fluid pressure supply conduit system arranged to cause said power cylinders to work simultaneously and to impose substantially the same inward force on the pressure rings, so that a balanced thrust is applied to the tire beads; this being requisite to the accomplishment of the desired centering of the tire tread in the matrix.

It is also an object of the invention to provide a tread centering device which embodies opposed pressure ring units adapted for ready attachment to existing tire retreading molds, or installation on new molds at the time of manufacture thereof.

A still further object of the invention is to provide a tread centering device, of the type described, wherein the pressure rings serve the additional purpose, when the mold is opening, of freeing the tire from one or both of the matrix halves, whereby to facilitate tire removal from the mold after the retreading operation is completed.

Still another object of the invention is to provide a practical, reliable, and durable tread centering device, for a tire mold, and one which will be exceedingly effective for the purpose for which it is designed.

These objects are accomplished by means of such structure and relative arrangement of parts as will fully appear by a perusal of the following specification and claims.

In the drawings:

Fig. 1 is an elevation, mainly in section, of the tread centering device as mounted in connection with a tire retreading mold.

Fig. 2 is a side elevation of one of the pressure ring units.

Fig. 3 is a fragmentary plan view of the same.

Fig. 4 is a diagram of the valve controlled, fluid pressure supply conduit system; the valve being shown in the position occupied thereby to advance the pressure rings.

Fig. 5 is a fragmentary diagram showing the position of the valve to retract the pressure rings.

Fig. 6 is a fragmentary diagram showing the valve closed, as when the pressure rings are stationary and not under force in either direction.

Referring now more particularly to the characters of reference on the drawings, the tread centering device is here shown as used in connection with a tire retreading mold of full circle type; such mold being indicated generally at 1.

The mold 1 comprises a pair of annular body sections 2 and 3 formed with steam chambers 4 and 5, respectively; the body sections 2 and 3 carrying annular matrix halves 6 and 7 which—when the body sections are closed—form a channeled matrix for the reception of a tire, indicated generally at 8. The body sections 2 and 3 are shown in their closed position in Fig. 1; it is being understood that these body sections are relatively opened, for placement of the tire 8 in—or to remove it from— the mold.

The body sections 2 and 3 include side skirts 9 and 10 defining relatively large-diameter central openings in the mold body.

The tire 8, as confined in the mold when closed, carries an air bag 13 supported within said tire on an inside curing rim 14; the air bag having a stem 15 which projects through the rim 14 for the purpose of inflating said bag.

The tread centering device to which the present invention pertains comprises a pressure ring unit 1, indicated generally at 16, mounted in connection with each of the body sections 2 and 3. As such pressure ring units 16 are of identical construction, though mounted in opposition, a description of one will serve for both.

Each pressure ring unit 16 comprises a pressure ring 17 which bears against the related tire bead 18 from the outside; each ring 17 having an annular groove 19 therein for the reception of said tire bead.

Also, each pressure ring 17 is formed, axially outwardly from the groove 19, with an enlarged, radial flange 20 which bears against the adjacent tire sidewall 21 near but short of the corresponding bead 18. Such radial flange 20 assures against the ring 17 escaping inwardly through the corresponding tire bead 18; i. e., effectively supports such pressure ring 17 against the tire bead 18 and adjacent part of the sidewall 21.

Each pressure ring 17 is formed with a spider 22 having a hub 23 fixed to the inner end of the piston rod 24 of a power cylinder 25 which extends axially outwardly through the central opening of the corresponding body section of the mold. At its other end the piston rod 24 carries a piston 26 which works in the cylinder 25; the latter being of double-acting type.

The power cylinder 25 is supported by a spider 27 from a mounting ring 28. The mounting ring 28 is formed at its outer peripheral corner with an annular notch 29 in which the inner edge portion of the side skirt 9 or 10 seats.

Circumferentially spaced L-shaped clamps 30 bear at their inner ends on the mounting ring 28, and at their outer ends against the related side skirt; such clamps 30 being retained in place by studs 31 which project from the mounting ring 28 through the clamps, whence said studs are fitted with wing nuts 32. In this manner the mounting ring 28 is effectively secured to the corresponding side skirt 9 or 10 of the body section 2 or 3; such ring rigidly supporting the power cylinder 25 coaxially of the mold for the purpose of working the pressure ring 17 in a direction exactly on the axis of the matrix in which the tire 8 is confined for the purpose of vulcanizing the new tire tread, indicated at 33.

The pressure ring 17 is prevented from turning relative to the mounting ring 28 by means of a guide rod 34 which upstands from one of the spider arms 22 of said pressure ring in offset relation, but parallel, to the axis thereof, and said guide rod 34 runs through a guide 35 on one of the spider arms 27 of the mounting ring 28.

With the opposed pressure ring units 16 mounted on the mold 1 in the manner shown and described, the power cylinders 25 may be actuated to simultaneously advance the pressure rings 17, or to retract the same; this being accomplished through the medium of the fluid pressure supply conduit system shown in Figs. 4-6 inclusive.

As shown in Fig. 4 such system comprises a fluid pressure supply conduit 36; a vent conduit 37; a feed conduit 38 branched as at 39 and 40; and a separate feed conduit 41 branched as at 42 and 43.

The branches 39 and 40 of the feed conduit 38 lead to connection with corresponding power cylinders 25 at the outer ends thereof; the connection being made by means of fittings 44. The branches 42 and 43 of the feed conduit 41 lead to connection with the inner end portions of corresponding power cylinders 25; the connection being made by means of fittings 45.

The conduit system, as above, is controlled by a four-way valve 46 connected with conduits 36, 37, 38, and 41 in a manner such that in one position of the valve, as in Fig. 4, conduit 36 communicates with conduit 38, so as to deliver fluid pressure to the outer ends of the cylinders 25 to cause advance of the latter, together with the related pressure rings 17. In this position of the valve the feed conduit 41 is in communication with the conduit 37 whereby to vent the cylinders 25 from their inner ends.

By reversing the position of the valve 46, as shown in Fig. 5, conduit 36 communicates with feed conduit 41, whereby the power cylinders 25 are energized from their inner ends so as to retract the pressure rings 17; said cylinders 25 then being vented from their outer ends by reason of communication of conduit 38 with conduit 37.

The cylinders 25 are both of the same effective diameter, and the conduit system—described above—delivers equal pressure to said cylinders.

The above described tread centering device operates in the following manner:

With the cylinders 5 and pressure rings 17 retracted, the mold is opened; i. e. the body sections 2 and 3 are relatively separated. Thereafter, the tire 8, with the air bag 13 and inside curing rim 14 therein, is placed in the body section 3.

With the tire so disposed in the body section 3, the cylinders 25 are energized to advance the pressure rings 17, and then the mold is closed, and the body sections 2 and 3 locked together.

Upon such closing of the mold, the opposed pressure rings 17, of the pressure ring units 16, engage corresponding tire beads 18, urging the latter toward each other; i. e. to the dotted line positions shown in Fig. 1.

As the power cylinders 25 maintain a constant inward but yieldable pressure on the tire beads 18 as the mold is closed, the result is a reduction in the all-over diameter of the tire; the retraction of the tire tread 13 being indicated by the dotted lines 47 in Fig. 1, which retraction is due to the tire sidewalls 21 pulling about the inside curing rim 14 under the influence of the power urged pressure rings 17.

In order to prevent the pressure rings 17 from possibly engaging the stem 15 when the pressure rings 17 are advanced, such rings are formed, at their periphery and in the inner portion thereof, with circumferentially spaced pairs of alined notches 48; the pressure ring units 16 being mounted so that one of such pairs of notches 48 is in alinement with the stem 15.

The next step in the operation is the inflation of the air bag 13 by means of an air hose (not shown) connected to the stem 15; the tire 8, under the influence of the inflation of the air bag 13, expanding or returning to its normal diameter, with the tire tread 33 forcefully engaged against the corresponding portion of the matrix.

Upon inflation of the air bag 13, the tire beads 18, as the tire 8 returns to its normal diameter, are forced apart; i. e. move outwardly generally axially of the mold; such movement being even or equalized by reason of the fact that the pressure rings 17 are forced outwardly simultaneously, and against counter-action of the cylinders 25, to the position shown in full lines in Fig. 1. This assures that the tire 8, and particularly the tire tread 33, is properly positioned or centered in the matrix, to the end that such tire tread—when vulcanized—is in true circumferential alinement on the tire.

The balanced pressure imposed by the pressure rings 17 on the tire beads 18 prevents any possible skewing, laterally, of the tire 8 in the matrix.

During the initial portion of the vulcanizing operation, the pressure rings 17 are urged toward each other by the power cylinders 25 until the tire tread 35 obtains an initial vulcanization set in the matrix, and thereafter the cylinders 25 are operated to retract the pressure rings 17, relieving the latter from the tire beads 18 for the remainder of the vulcanizing period.

It is to be noted that under some conditions it may be desired to maintain the pressure rings 17 under advancing power from the power cylinders 25 for the full vulcanizing period.

After the vulcanizing period is complete, and the air bag deflated and the pressure rings 17 retracted, the mold is unlocked, which step is followed by energizing the power cylinders 25 to advance the pressure rings 17. With such advance of the pressure rings 17 toward each other, there is again a substantial reduction in tire diameter, aiding in freeing of the tire 8 from the matrix. Thereafter, the body sections 2 and 3 are relatively opened, with the pressure rings 17 remaining under advancing power. As the body sections open, the pressure rings 17 tend to push the tire free from said sections; the tire in many instances then being removable merely by hand from the mold.

If the pressure rings 17, under advancing power, do not wholly free the tire when the mold is opened, a customary tire pull-out hook may be employed for the removal of the tire.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tread centering device, for a tire mold which includes a body having a matrix for the reception of a tire with the beads exposed; said device comprising axially movable pressure rings engaging the tire beads from the outside, a fluid pressure actuated power cylinder connected axially to each pressure ring from outwardly thereof, mounting means between each cylinder and the mold body, and a fluid pressure supply conduit system coupled to said power cylinders in a manner whereby the same simultaneously yieldably urge the rings toward each other.

2. A device, as in claim 1, in which each pressure ring includes an annular groove in which the corresponding tire bead engages, and an annular flange which bears against the corresponding tire sidewall adjacent but short of said bead.

3. A tread centering device, for a tire mold which includes a body having a matrix for the reception of a tire with the beads exposed; a pair of fluid pressure actuated power cylinders mounted axially in connection with the mold and projecting outwardly in opposition, the cylinders including inwardly extending piston rods, a pressure member on the inner end of each piston rod having an annular portion engaging the corresponding tire bead, and a fluid pressure supply conduit system coupled to said power cylinders in a manner whereby the same simultaneously yieldably urges the members toward each other.

4. A tread centering device for a tire mold which includes a matrix for the reception of a tire with the beads exposed, said device comprising a pair of spaced opposed power cylinders, means mounting the power cylinders in connection with the mold in axial alinement with the matrix supported tire but clear of the beads, circular pressure members engaging the tire beads from the outside, means securing the circular pressure members in connection and axially alined with the corresponding power cylinders, and a fluid pressure supply conduit system coupled to said power cylinders to cause simultaneous operation thereof in a manner whereby to yieldably urge the circular pressure members and engaged tire beads toward each other.

References Cited in the file of this patent

UNITED STATES PATENTS

| | | |
|---|---|---|
| 2,302,133 | Maze | Nov. 17, 1942 |
| 2,509,830 | MacMillan | May 30, 1950 |
| 2,574,171 | Collins et al. | Nov. 6, 1951 |
| 2,593,137 | Glynn | Apr. 15, 1952 |